United States Patent [19]
MacGregor

[11] Patent Number: 5,112,145
[45] Date of Patent: May 12, 1992

[54] PISTON AND BEARING ASSEMBLIES

[75] Inventor: James W. MacGregor, Ann Arbor, Mich.

[73] Assignee: Detroit Diesel Corporation, Detroit, Mich.

[21] Appl. No.: 713,974

[22] Filed: Jun. 11, 1991

Related U.S. Application Data

[62] Division of Ser. No. 467,136, Jan. 18, 1990, Pat. No. 5,072,654.

[51] Int. Cl.$^5$ .............................................. F16C 33/04
[52] U.S. Cl. .................... 384/286; 384/255
[58] Field of Search ............... 384/286, 291, 295, 287, 384/118, 114, 255

[56] References Cited

U.S. PATENT DOCUMENTS

| | | |
|---|---|---|
| 2,069,594 | 2/1937 | Schneider . |
| 2,850,340 | 9/1958 | Brill . |
| 2,990,226 | 6/1961 | Fangman . |
| 3,004,810 | 10/1961 | King . |
| 3,201,183 | 8/1965 | Buske . |
| 3,311,428 | 3/1967 | Scheufler . |
| 3,433,539 | 3/1969 | Nigh . |
| 3,555,972 | 1/1971 | Hulsing . |
| 3,680,932 | 8/1972 | Raimondi . |
| 3,762,389 | 10/1973 | Malina . |
| 3,789,743 | 2/1974 | Sihon . |
| 3,830,552 | 8/1974 | Schuller et al. . |
| 3,859,976 | 1/1975 | McWhorter . |
| 3,943,908 | 3/1976 | Kubis et al. . |
| 4,311,349 | 1/1982 | Roberts .......................... 384/286 |
| 4,359,933 | 11/1982 | Fricke . |
| 4,644,853 | 2/1987 | Russell et al. . |

FOREIGN PATENT DOCUMENTS

| | | | |
|---|---|---|---|
| 610026 | 12/1960 | Canada ...................... 384/291 |
| 1459185 | 10/1966 | France ...................... 92/216 |
| 12023 | 1/1979 | Japan ...................... 74/579 E |
| 56-6914 | 1/1981 | Japan ...................... 384/291 |
| 430191 | 6/1935 | United Kingdom ............. 384/291 |

Primary Examiner—Lenard A. Footland
Attorney, Agent, or Firm—Brooks & Kushman

[57] ABSTRACT

A prefinished piston pin insert bearing wherein the radial clearances required for acceptable bearing function are maintained in spite of the tolerance required for assembly through a combination of inner bearing surface geometry and related structure for retaining the bearing against axial and rotational movement. The interior bearing geometry is formed of radii equal to that of the piston pin which are offset vertically into the upper and lower bearings to generate a load bearing surface thereon and of radii offset horizontally and of sufficient length to provide assembly clearance for the piston pin and a load bearing surface of approximately 120° to 150°. The bearings are retained against movement through connections with the piston head, the piston skirt, and between the various bearing pieces. Means are also provided for feeding oil under pressure to the piston pin and bearing interface for lubrication and to the piston assembly for cooling.

13 Claims, 9 Drawing Sheets

ASSEMBLY

FIG. 3A ASSEMBLY

FIG. 3C INERTIA LOADED

FIG. 3B GAS LOADED

PISTON AND BEARING ASSEMBLIES

CROSS-REFERENCE TO RELATED APPLICATION

This application is a division of U.S. Ser. No. 467,136, filed on Jan. 18, 1990, now U.S. Pat. No. 5,072,654, entitled "Piston and Bearing Assemblies" which is incorporated herein by reference and is assigned to the same assignee of record.

TECHNICAL FIELD

This invention relates to insert bearings for use with piston pin joints and other insert bearing applications. In a specific embodiment, the invention relates to a diesel four-stroke cycle engine piston insert bearing assembly.

BACKGROUND ART

Proper design of a piston pin/connecting rod joint of reciprocating piston engines is critical to overall engine reliability and durability. Perhaps nowhere are the demands greater than heavy-duty diesel engines where heavy loads and long life are foremost on a long list of design requirements.

Insert bearings have been used in numerous bearing applications including, but not limited to, engine main and connecting rod bearings, railway vehicle axle bearings and engine piston pin bearings of various types. In the particular case of engine piston pin bearings, a commonly used application has been as the main load-carrying bearing in the oscillating piston pin joint of two-cycle engine pistons. Pertinent examples of the latter include U.S. Pat. No. 3,433,539 to Nigh, U.S. Pat. No. 3,555,972 to Hulsing and U.S. Pat. No. 3,762,389 to Malina.

In four-stroke cycle engine pistons, the operating conditions may impose significant reverse loads on the piston pins during the piston intake and exhaust strokes when outward centrifugal forces are not significantly counteracted and may be added to by low or below ambient cylinder pressures acting on the pistons. Thus, in four-stroke cycle piston assemblies, load carrying bearings are commonly required on both the top and bottom sides of the piston pin. Known constructions include the use of individual insert bearings as in U.S. Pat. No. 2,850,340 to Brill and U.S. Pat. No. 3,943,908 to Kubis et al. A one-piece insert bearing with extended upper surfaces is shown in U.S. Pat. No. 2,069,594 to Schneider and a three-piece insert bearing with an extended upper surface is shown in U.S. Pat. No. 4,644,853 to Russell et al. These arrangements provide load-carrying capabilities in both directions of piston reciprocation and a close pin-to-bearing clearance.

Development testing of a recent four-stroke diesel engine indicated that to attain long life with high loads special attention in the piston pin bearing area would be needed. Development focused on a one-piece, 360° bearing that provided a full width bearing surface on the upper compression loaded side. In the lower inertia loaded side, the bearing was extended circumferentially from the upper side in the ear section of the piston head to form a complete 360° bearing surface. As it was configured for production, the one-piece bearing was pressed in place and finish machined to a cylindrical shape as by boring and/or broaching. The negative impact of this design on producibility, serviceability and cost became apparent with time. Although without functional problems in the field, a development program was pursued to relieve these concerns. A number of conceptual designs were proposed that incorporated prefinished bearings that were installed and retained in different ways.

SUMMARY OF THE INVENTION

The present piston bearing design was the answer to previous concerns. In addition to obvious manufacturing benefits, it has been demonstrated to have superior bearing functions as well. The embodiment of this design departs from the prior art in two important areas, namely (i) the mechanical aspects of the bearing assembly and retention, and (ii) in the bearing oil film behavior. These are not separable from one another. The present invention involves the use of a unique one, two or three-piece insert bearing assembly between the piston pin, piston head and connecting rod. The three-piece insert bearing consists of an upper insert bearing of sufficient length to bridge the openings in the piston head and a lower insert bearing at each end of the upper insert bearing, the lower insert bearings being separated by the upper end of the connecting rod. When assembled, the ends of the upper and lower bearings each form a cylinder in the openings in the piston head while the upper insert bearing also bridges the gap between the cylindrical openings in the piston head and engages a downwardly opening saddle portion of the piston head. The one-piece insert bearing is similar to that of the three-piece insert bearing except that the lower insert bearings are integral with the upper bearing, making a single insert bearing. The two-piece insert bearing is similar to that of the three-piece insert bearing except that the two lower insert bearings are integrated into a single bearing.

The present invention involves a piston and bearing assembly wherein a variable wall thickness—offset center insert bearing design is the result of various studies and analysis. This arrangement insures proper oil thickness during engine operation under load. These and other features of the invention will be more fully understood from the following description of the preferred embodiment taken together with the accompanying drawings.

DETAILED DESCRIPTION

Figure 1:
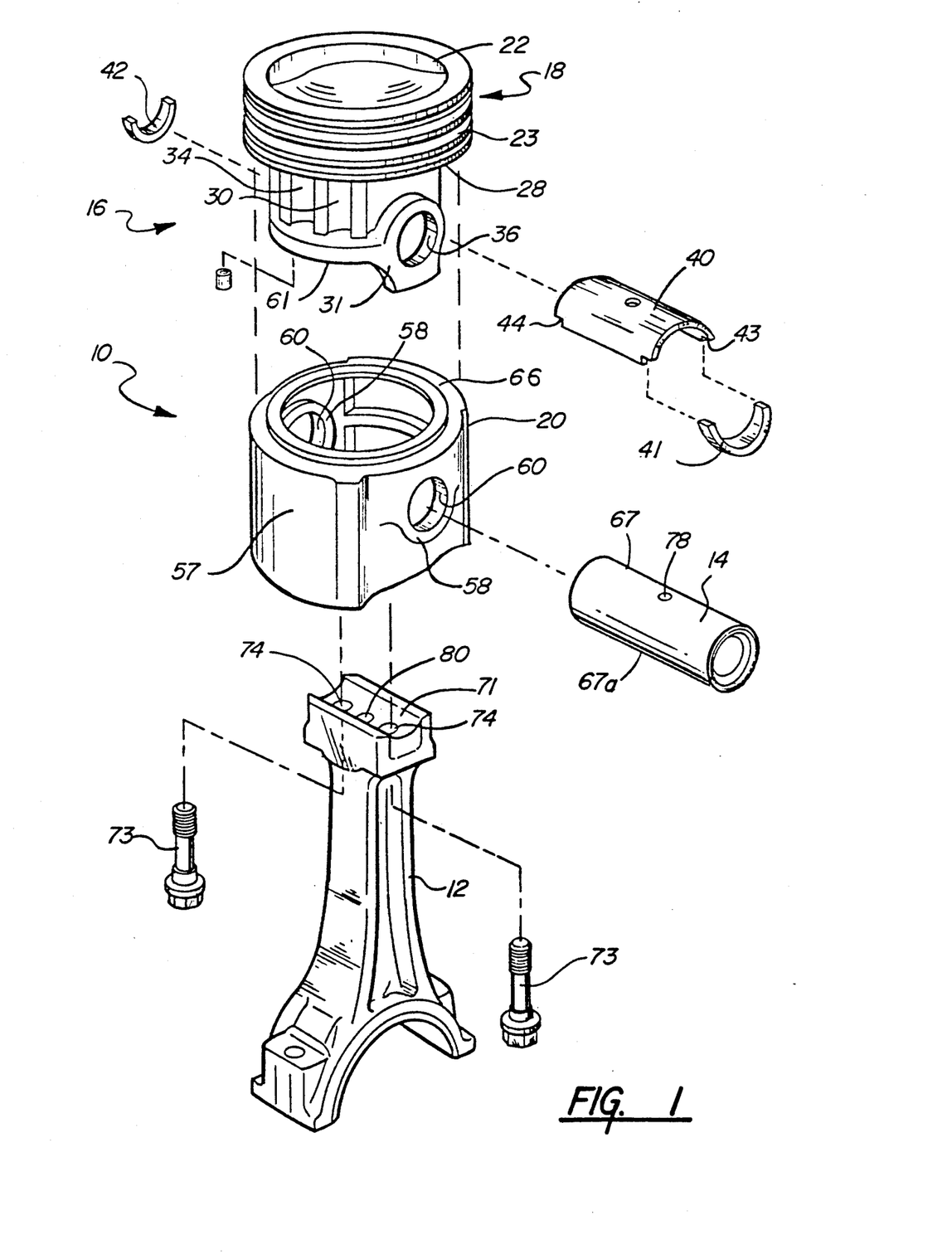
FIG. 1 is an exploded pictorial view of the crosshead piston assembly primarily intended for use in four-stroke cycle diesel engines and including preference bearing means in accordance with the invention.

Referring now to the drawings in detail, numeral 10 generally indicates a crosshead piston connecting rod assembly intended for use especially in four-stroke cycle diesel engines and formed in accordance with the invention. Assembly 10 includes a connecting rod 12, a piston pin 14 and a piston assembly generally indicated by numeral 16. The piston assembly includes two primary elements—a head member 18 and a skirt member 20, each of which is integrally formed preferably of cast iron.

Figure 2:
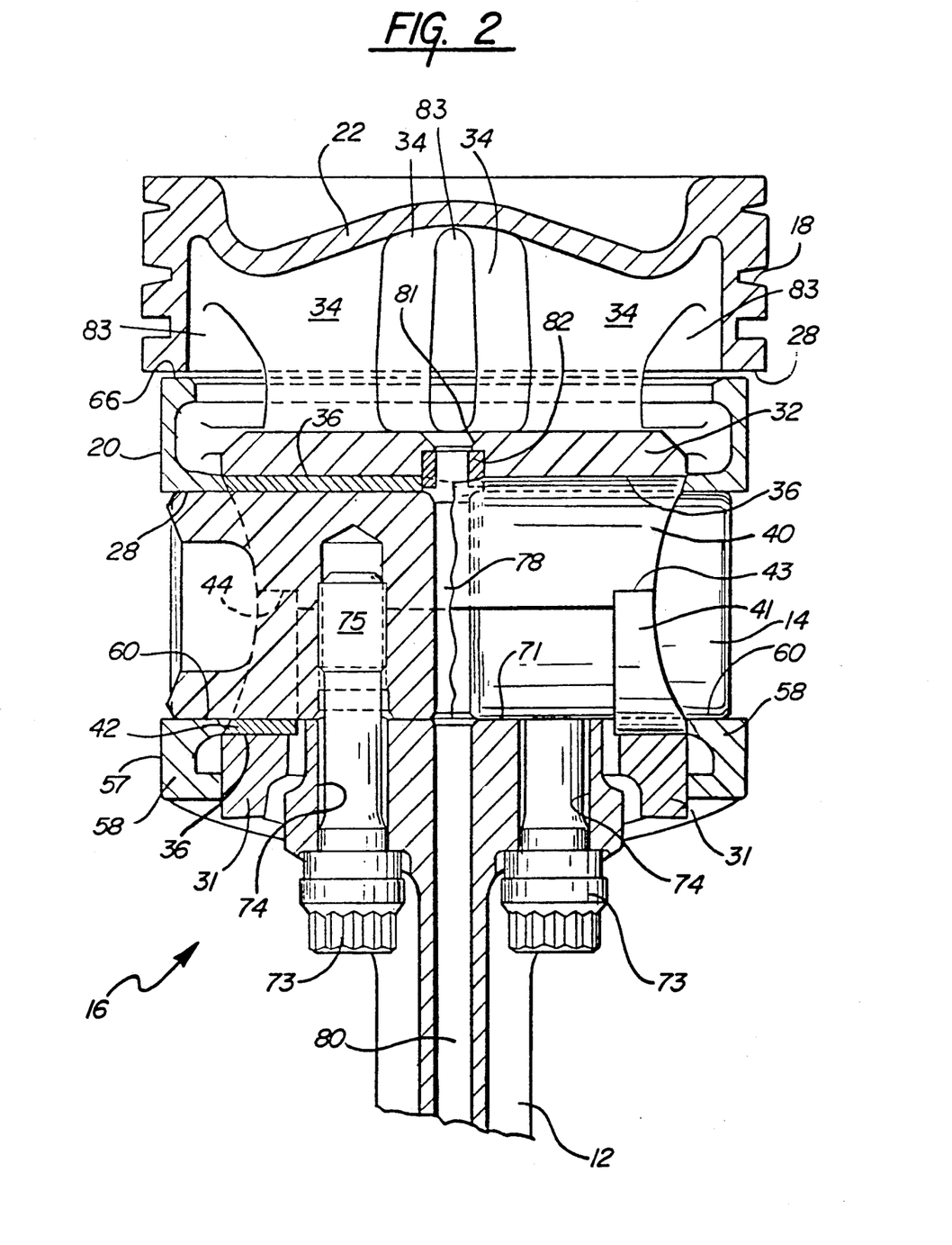
FIG. 2 is a cross-sectional view of the piston assembly of FIG. 1.

The head member 18 includes a crown section 22, from the outer edge of which depends an annular ring belt section 23 containing three ring grooves for receiving top and second compression rings and an oil control ring. The ring belt section 23 terminates at an annular end 28.

The piston head member further includes a piston pin connecting section 30 generally comprising a pair of spaced downwardly extending pin encircling ears 31. A saddle portion 32 and the ears 31 are connected with the crown section 22 by a plurality of axially and radially extending struts or columns 34.

Saddle portion 32 defines a downwardly opening part-cylindrical upper recess 35 coaxially aligned with a pair of cylindrical piston pin receiving openings 36 formed in the pin encircling ears 31. Cylindrical openings 36 additionally receive and retain, in a manner to be subsequently more fully explained, part-cylindrical insert bearings 40, 41 and 42.

Figure 4:
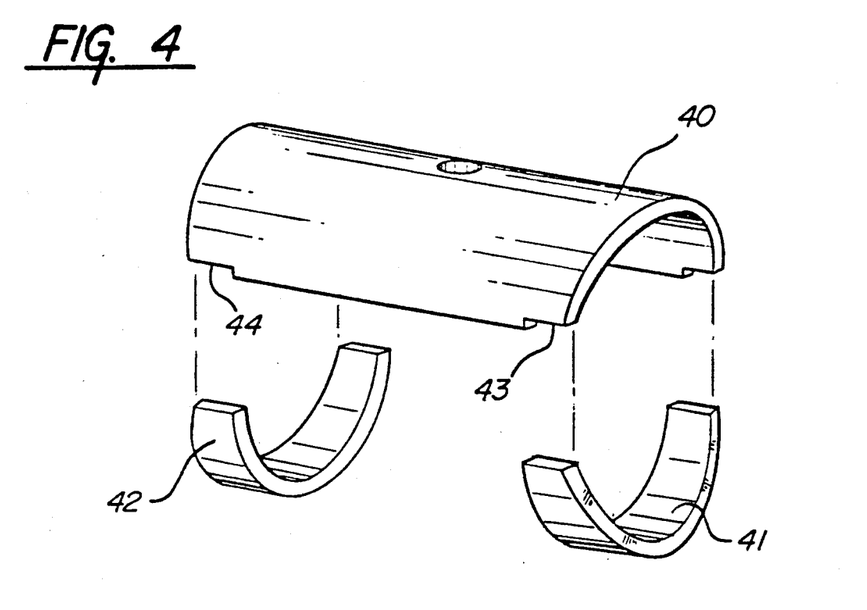
FIG. 4 is a pictorial view of the insert bearings in a preferred form in accordance with the present invention.

Notches 43 and 44 in the upper insert bearing 40 engage the lower insert bearings 41 and 42 to prevent their inward movement along the openings 36. The notches of the upper bearing may be replaced by angled surfaces to accomplish the same end.

The skirt member 20 includes a generally cylindrical wall 57 having a pair of centrally located oppositely disposed inwardly extending bosses 58. The bosses have cylindrical pin receiving openings 60 which, when the head member and skirt member are assembled, are coaxially aligned with the pin receiving opening 36 of the head member pin connection section.

The skirt cylindrical wall 57 extends sufficiently above and below the pin receiving openings 60 to provide an adequate bearing surface for engaging an associated cylinder liner and absorbing side thrust forces acting on the piston. At its upper end, the skirt wall 57 terminates at an annular end 66 which extends close to the lower end 28 of the piston head ring belt section 23, with preferably a small clearance to permit relative motion of the independent head and skirt sections.

The head and skirt members of the piston assembly are retained together by the cylindrical piston pin 14 which has oppositely facing upper and lower part cylindrical surfaces 67,67a received in openings 60,36 of the skirt and head members respectively. The skirt is supported for oscillation on the pin by sliding direct contact between the interiors of the cylindrical openings 60 with the outer ends of the cylindrical pin surfaces 67,67a. The head member 18 is supported for oscillating motion on the pin 14 by engagement of the pin's upper surface 67 with the insert bearing 40 retained in the saddle portion 32 and pin receiving openings 36 and by engagement of the pin's lower surface 67a with the bearing inserts 41,42 received in the lower portions of the openings 36.

The lower surface 67a of piston pin 14 is secured to a part cylindrical saddle portion 71 of the connecting rod 12 by means of bolts 73 which extend through openings 74 in the rod and into engagement with threaded openings 75 disposed within the piston pin 14. A transverse oil passage 78 goes through the pin and aligns with a drilled oil supply passage 80 extending lengthwise through the connecting rod 12. The saddle portion 71 on the connecting rod extends about 110° in circumference. The extent of the saddle portion on the connecting rod is largely dependent upon the size of the piston pin which, in this instance, is approximately one and one-half inches in diameter.

The interior of the piston head is cooled by oil delivered through the connecting rod passage 80 through the passage 78 of the piston pin 14, the opening 81 of the saddle portion 40, and the dowel pin insert 82 in the saddle portion 32 to the interior 83 of the head where it is splashed against the head by reciprocating motion of the piston. Close clearances at the exterior of the ears 31 and ribs 61 of the head and interior of the bosses 58 and ribs 62 of the skirt maintain a body of cooling oil with the head. Excess oil is returned to the engine sump through the drain openings 84 and some lubricates the liner walls by passage through the clearance between the adjacent ends 28,66 of the ring belt and skirt respectively. Some of the oil also lubricates the piston pin insert bearings 40–42.

Figures 3A, 3B, 3C:
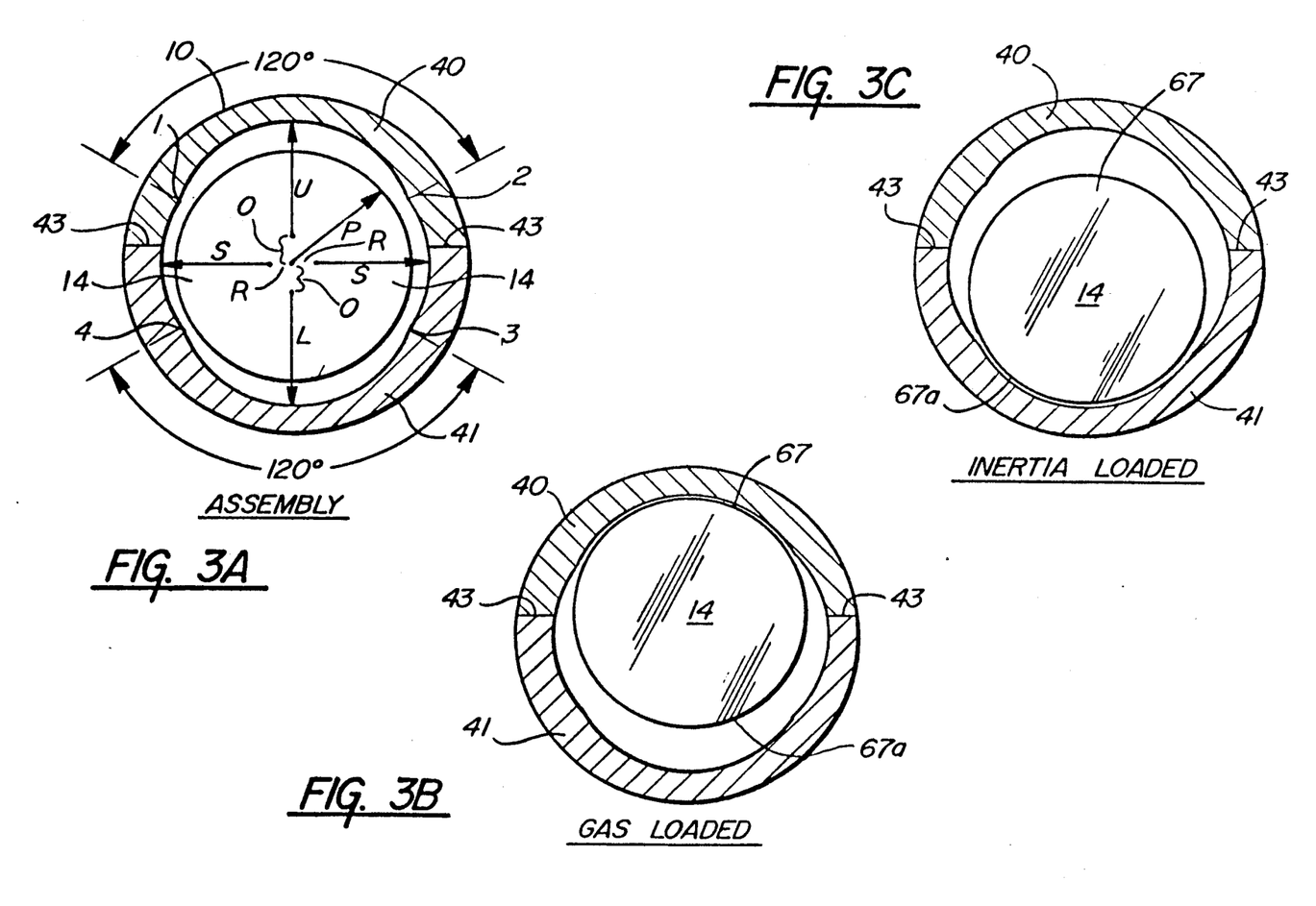
FIGS. 3A, 3B and 3C are cross-sectional views of the insert bearings showing their relationship to the piston pin in the assembly or centerline position, the gas-loaded position and the inertia-loaded position, respectively.

In accordance with the invention and referring to FIGS. 3A, 3B and 3C, the piston head 18 is permitted some limited up and down motion with respect to the piston pin 14. This is accomplished by forming the interior surfaces of portions of the upper and lower insert bearings 40, 41 and 42 with upper and lower radii which are offset from the centerline. Each radius is equal to the piston pin radius P. The radii U and L of the upper and lower insert bearings are equally offset vertically by an amount O along a first division diameter. The sides of the upper and lower insert bearings are also formed with radii S which are offset horizontally from the nominal center along a second division diameter by a distance R to provide clearance for insertion of the piston pin. It should be noted that it is not essential that the sideways offset be as great as that shown in FIG. 3.

Figure 5:
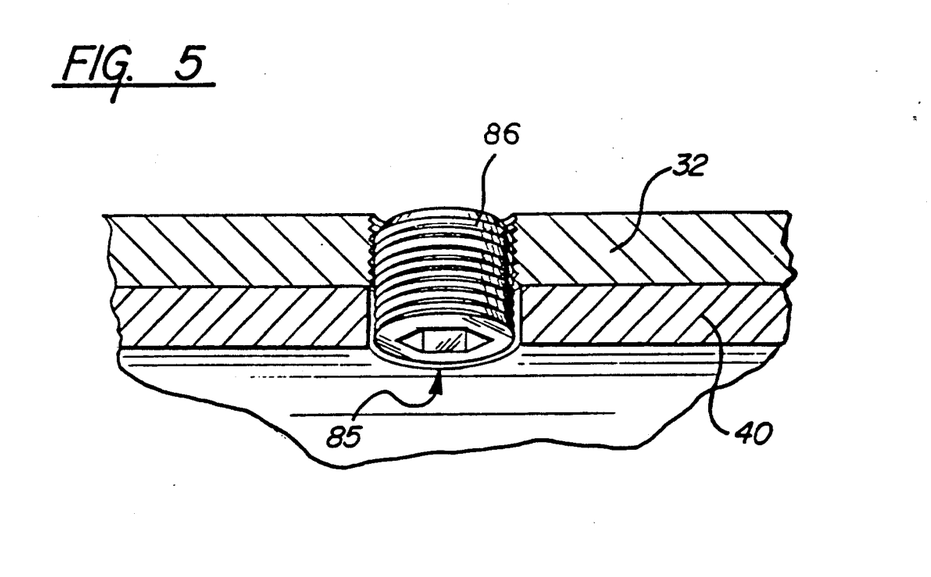
FIG. 5 is a sectional view through a portion of the upper bearing and the saddle portion of the piston head showing, in accordance with the present invention, an alternate means of retaining the bearings against rotative movement and yet providing an oil passage to the upper portion of the piston head.
Figure 6:
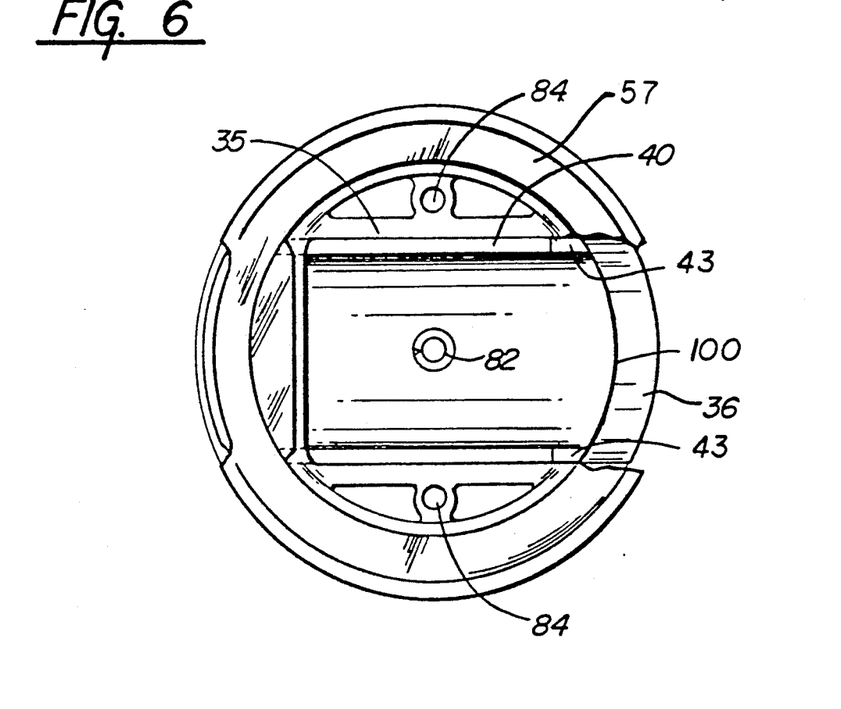
FIG. 6 is a plan view of the present invention looking up at the piston assembly with the piston pin removed and the lower portion of the skirt member cut-away to show how the edge of the upper insert bearing engages the inner edge of the piston skirt.
Figure 7:
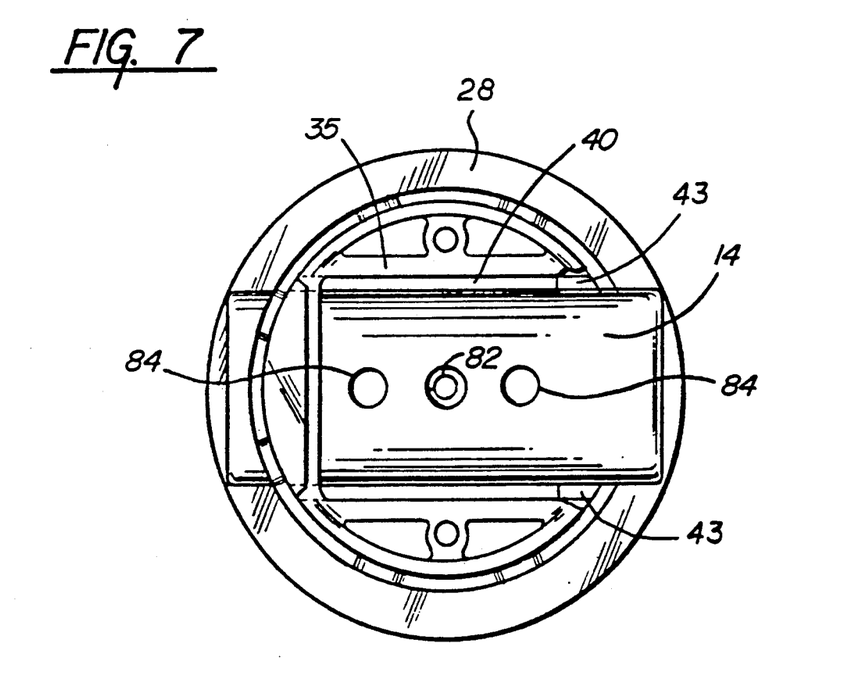
FIG. 7 is a plan view similar to that of FIG. 6, but showing the piston pin in place and the skirt removed.
Figure 8:
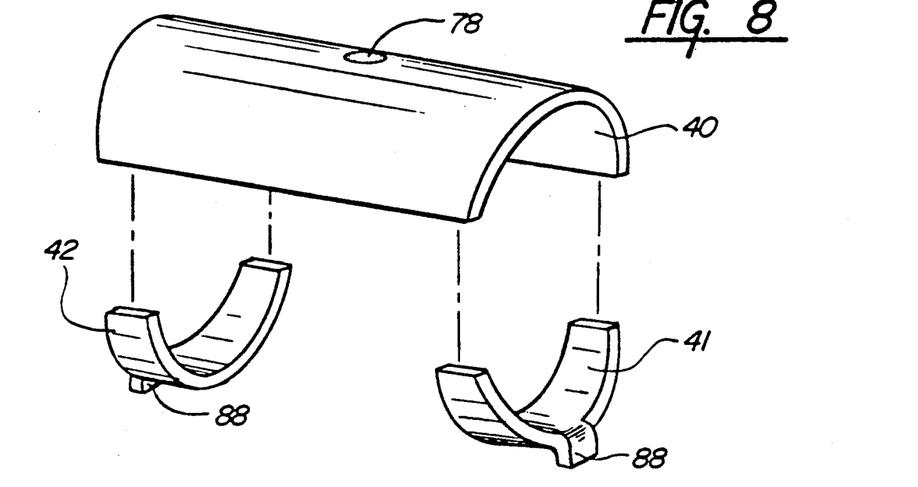
FIG. 8 is a pictorial view of upper and lower insert bearings utilizing, in accordance with the present invention, an alternate form of antirotation connection.
Figure 8A:
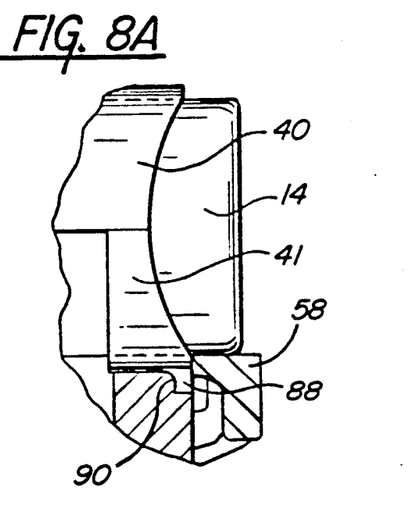
FIG. 8A is a sectional view of a portion of the piston head showing the alternate form of FIG. 8.

The interior walls of the bearings may be first bored or broached to produce a circular opening having a diameter slightly greater than the piston pin diameter and thereafter may be broached to produce the complex form with the offset radii. Points 1, 2, 3 and 4 are the points where the radii intersect. FIG. 3A shows the insert bearing with the pin in the assembly or centerline position. FIG. 3B shows the bearing and pin in the gas-loaded position. FIG. 3C shows the bearing and pin in the inertia-loaded position. It should be noted that oil is trapped between points 1 and 2 and between points 3 and 4 in small gaps formed as a result of the radii U and L being equal to radius P and being offset. The offsets of radii U and L in the insert bearings comprise an important feature of the invention as they permit prefinishing of the bearings 40, 41 and 42 before insertion in the piston head and skirt while allowing tight radial clearances to be maintained between the bearings 40, 41 and 42, and the piston pin surfaces 67,67a. As may be seen in FIGS. 3A and 4, the upper and lower bearing inserts 40, 41 and 42 are part-cylindrical. The extent that the dowel pin extends into the upper insert bearing 40 will determine the actual circumferential extent of the upper insert bearing. In other words, the farther the dowel pin protrudes into the upper insert bearing, the smaller the circumferential extent thereof. The circumferential extent of the lower insert bearings are then set so as to provide adequate engagement to the notches 43,44 in the upper insert bearing. In the assembly process, the upper insert bearing 40 is first inserted in the middle of the opening 35 of the upper saddle 32 of the head 18 and then over the dowel pin 82. FIG. 6 shows the upper insert bearing 40 in position. The next step in the assembly is the insertion of the lower insert bearings 41 and 42 in the head openings 36. Following this, the skirt member 20 is lowered over the piston pin connecting section 30 of head member 18 and the holes 36 in the head member and 60 in the skirt member are aligned for insertion of the piston pin 14. It should further be noted that FIG. 6 shows how the curved edges of the upper insert engages the curved inner edge of the piston skirt at the interface 100. It is important that the offset 0 of radii U and L be adequate to provide an opening at the points 1, 2, 3 and 4 at least equal to the diameter of the piston pin, otherwise, there will be pin-to-bearing interference with the upper and lower insert bearings and assembly will be impeded or require an additional finishing operation. Thereafter, the piston pin may be installed on the saddle portion 71 of the connecting rod by the bolts 73. It should be apparent that other means of retaining and locating the upper bearing are possible, including locally offset bearing sections into the centrally located oil hole in the head or by tabs into slots in the head provided for this purpose. If desired, the upper insert bearing may have a greater circumferential extent. This may be accomplished by inserting the hollow dowel pin 82 after the upper insert bearing 40 is installed, but this has an impact on the serviceability of the bearing assembly. Substituting an allen screw 86 (as in FIG. 5) for the dowel pin 82 resolves this concern. The allen screw is likewise inserted after the upper insert bearing is installed and may be drilled to furnish an oil path 85 to the head. The antirotation of the bearings 40-42 is not limited to an allen screw or dowel pin. For example, FIGS. 8 and 8A show the notches eliminated entirely and the upper and lower insert bearings being equal in circumferential extent. The lower insert bearings are retained by tabs 88 that fit into notches 90 in the ear section of the piston head. The engagement of the upper and lower bearings against the piston skirt retain the bearings against outward movement. The tabs on the lower insert bearings prevent inward movement and also provide the required retention against rotation.

Figure 9:
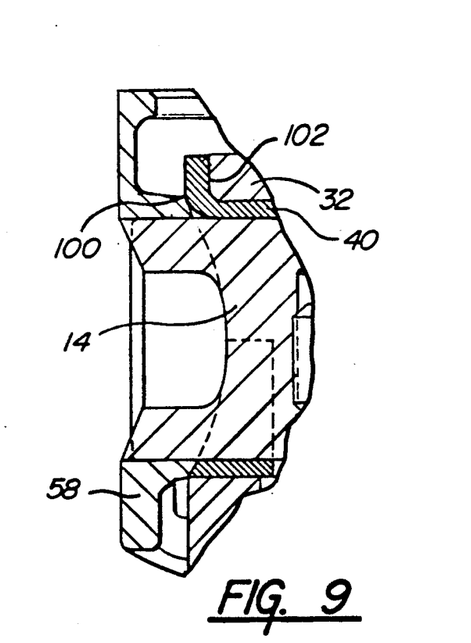
FIG. 9 is a sectional view through a portion of the piston head showing another alternate form of antirotation connection in accordance with the present invention.
Figure 9A:
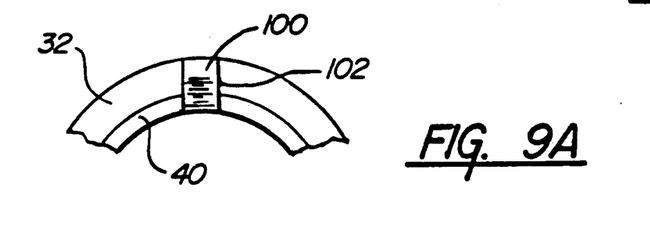
FIG. 9A is a partial side view cut away to show the antirotation connection of FIG. 9.

Similarly, as seen in FIGS. 9 and 9A, this can also be accomplished by a single tab 100 formed on one side of the upper insert bearing which engages a notch 102 on and in the upper saddle. FIG. 9A is a partial plan view showing the antirotation interconnection of FIG. 9. With the combination of this tab and the notch interconnection with the lower insert bearings there is no need for tabs on the lower insert bearings or for the allen screw 86 or dowel pin 82 inserts. With this design, the impact of the piston pin 14 on the circumferential extent of the upper insert bearing is eliminated and the bearing may be less than, equal to or exceed 180° so long as the lower insert bearings extend circumferentially to meet the ends of the upper insert bearing.

Figure 10:
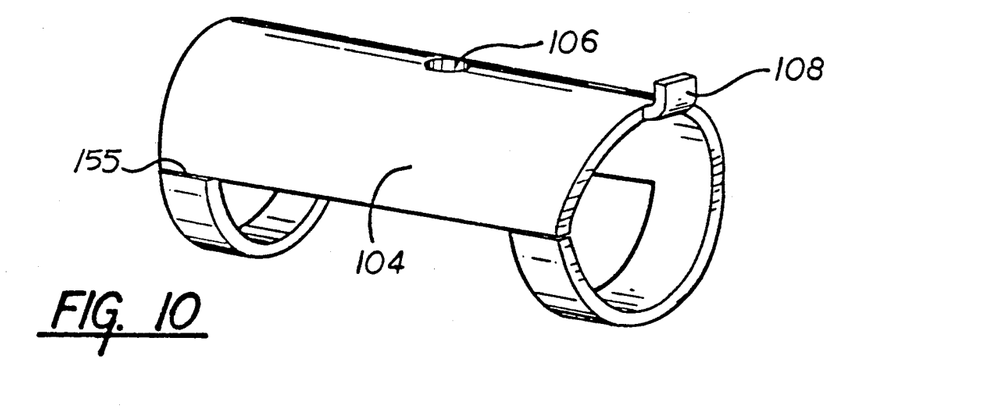
FIG. 10 is a pictorial view of an alternate one-piece insert bearing in accordance with the present invention.
Figure 11:
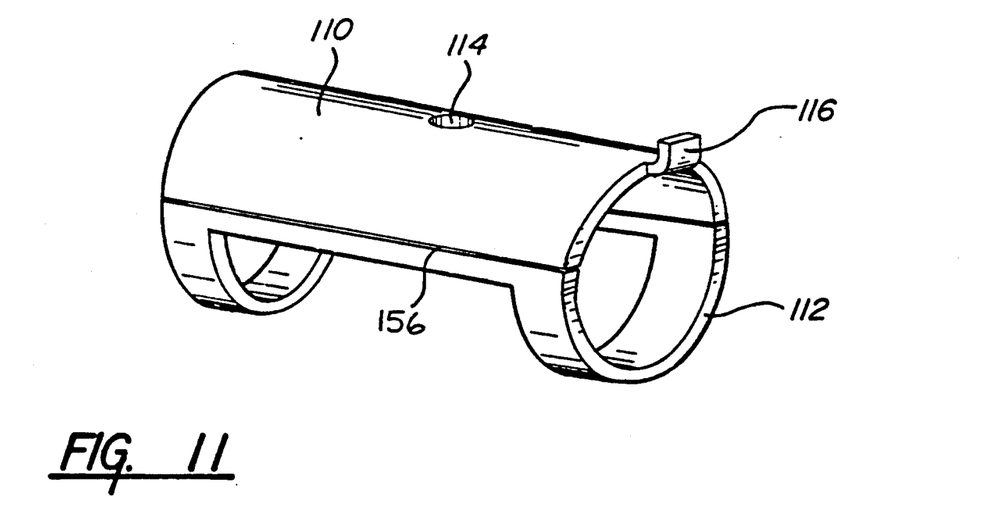
FIG. 11 is a pictorial view of an alternate two-piece insert bearing of the present invention.

FIG. 10 illustrates a unitary insert bearing 104. The insert may be retained by an allen screw passing through the hole 106 as in FIG. 5 or it may be detained against rotation by a tab 108. The insert bearing may also be made into two pieces as in FIG. 11 where the insert bearing is separated into upper and lower inserts 110 and 112, the upper insert bearing being retained against rotation by either an allen screw in the hole 114 or a tab 116 and the lower insert bearing through contact with the upper bearing and piston skirt.

As known to those skilled in the art, each of the insert bearings may initially be formed as a flat steel-backed bearing and then coined and rolled to as close a finished shape as is possible. The horizontal edges 155 and 156 result from such a process and are located in the unloaded portions of the bearings.

Figure 13:
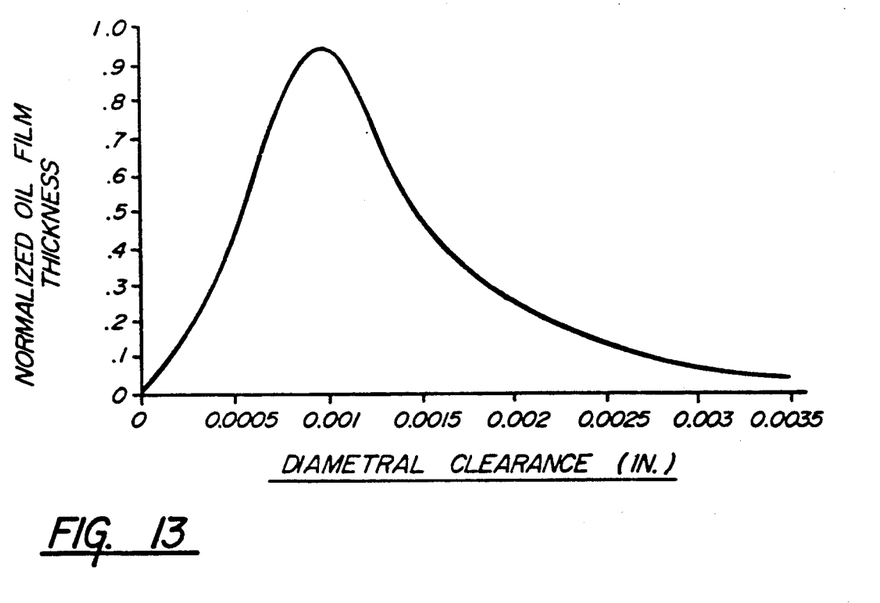
FIG. 13 is a graph illustrating the relationship between oil film thickness and diametrical clearance.

The variable wall thickness-offset center bearing design is supported by various studies and analysis. From hydrodynamic and squeeze film analyses, it is well documented that an optimal clearance exists for maximum oil film thickness. Greater clearances result in insufficient oil films which break down under load permitting metal-to-metal contact of adjoining bearing components, accelerated wear and eventual bearing failure. Lesser clearances restrict oil flow, preclude adequate heat dissipation and result in heat build-up, oil film penetration, metal-to-metal contact and eventual seizure. FIG. 13 illustrates the behavior of oil film thickness as a function of diametral bearing to pin clearance. From this example, it is apparent that currently practical ranges of manufacturing tolerance can significantly affect the sensitive minimum oil film thickness.

Figure 12:
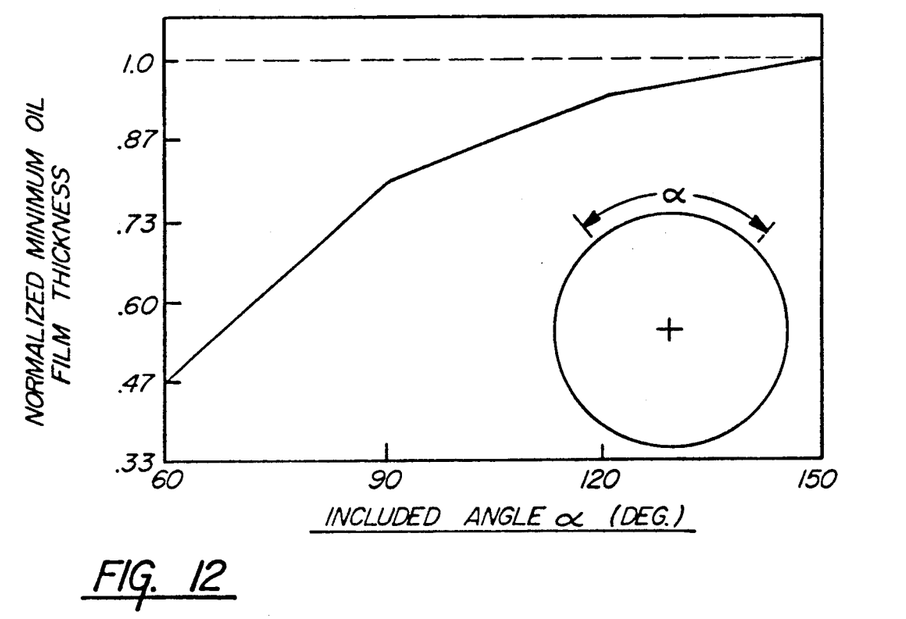
FIG. 12 is a graph illustrating the relationship between the included angle of bearing loading and oil film thickness.
Figure 14:
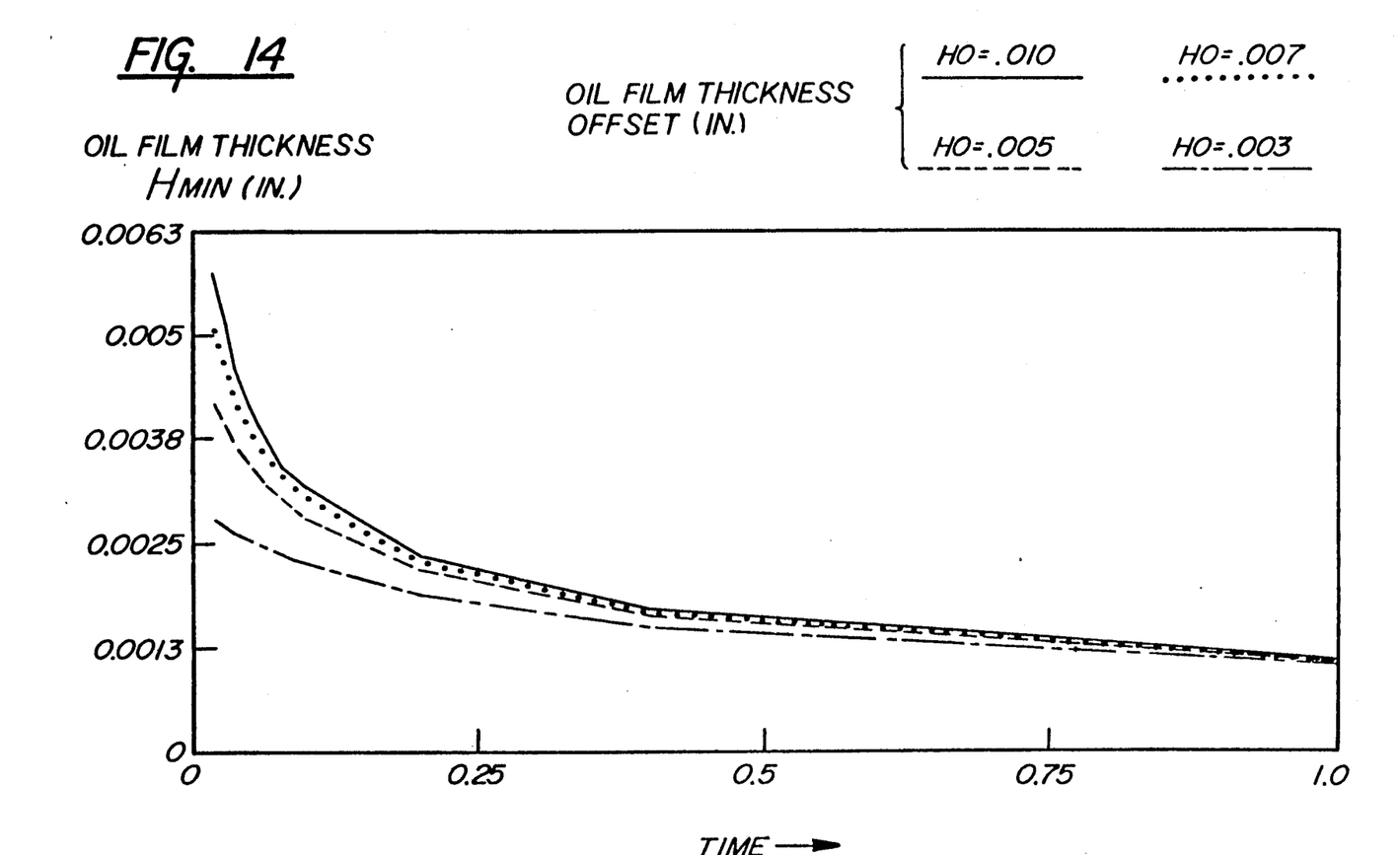
FIG. 14 is a graph illustrating the sensitivity of bearing oil film thickness to a range of offset values and illustrating the relationship between oil film thickness and the time it takes for the pin to go from the upper to lower bearing position.

The variable wall thickness-offset center bearing design permits reasonable manufacturing tolerances while simultaneously providing close control of the desired clearance. The features of this design are illustrated in FIG. 3 (as mentioned earlier). The pin and bearing assembly is shown in three relationships: during assembly, under compressively loaded conditions and under inertially loaded conditions. From this illustration, it is seen that by offsetting the centers controllable clearances can be achieved under the various modes of loading while allowing a practical clearance. In addition to the clearance afforded by the vertical offset centers, side relief radii S provide assembly clearance adjacent to the split line or circumferential ends of the bearing pieces. These side reliefs do not provide a bearing surface for the pin but are blended into the loaded sections in such a way as to provide approximately 120° to 150° of load-carrying bearing surface. One hundred twenty degrees was selected based on bearing film analysis graphically shown in FIG. 12. As shown here, increasing the included angle of bearing loading much beyond 120° has a diminishing benefit. The magnitude of the bearing offset 0 in the loaded 120° sections was selected based on film analysis similar to that depicted in FIG. 13. The horizontal axis offset R of the radii from the center of the head bore 36 was determined by assembly clearance and part tolerance requirements. FIG. 14 illustrates the sensitivity of bearing oil film to a range of vertical offset values. It can be seen that as the pin moves across the added clearance afforded by the vertical offset 0, as referenced as a function of time, different film thicknesses exist. However, as the pin seats into the loaded portion of either bearing piece, again as referenced as a function of time, minimum oil film thicknesses converge for a wide range of offset values. The transition period the pin spends in traversing from the upper to the lower bearing pieces has little effect on the final minimum oil film thickness that the loaded portion of the bearing piece will experience.

Although in the preferred embodiment both upper and lower bearing pieces incorporate identical design features as they relate to the oil film thickness, this need not be the case. Differing offsets 0, pin to bearing clearances or included angles of load-carrying bearing surface between the top and bottom pieces may be used.

While the invention has been described by reference to a preferred embodiment, it should be understood that numerous changes could be made without departing from the spirit and scope of the inventive concepts described. Further, it should be recognized that the insert bearing configurations described herein may be utilized in many other bearing applications wherein insert bearings may be applied. Thus, the invention is not intended to be limited to the specific embodiments described but to have the full scope permitted by the language of the following claims.

What is claimed is:

1. A journal bearing for rotatively supporting a journal pin member and comprising:
    a generally cylindrical inner bearing surface adapted to receive the journal pin member and having a center,
    said inner bearing surface including two pairs of diametrically opposed arcuate bearing surface portions,
    one said pair of diametrically opposed arcuate bearing surface portions being generated by first respective radii equal to the radius of the journal pin member and from a respective axis lying on a first division diameter extending through said center and offset therefrom a predetermined distance toward the respective bearing surface portion generated thereby,
    the other said pair of diametrically opposed arcuate bearing surface portions being generated by second respective radii from a respective axis lying on a second division diameter perpendicular to said first division diameter and extending through said center and offset therefrom a predetermined distance toward the respective bearing surface portion generated thereby,
    the said predetermined distances said two pairs of diametrically opposed arcuate bearing surface portions are offset being substantially equal,
    one of said pair of diametrically opposed arcuate bearing surface portions comprising an upper bearing section and a lower bearing section,
    at least one of said upper and lower bearing sections extending circumferentially from end to end an arc distance less than 180°;
    and the other of said pair of diametrically opposed bearing sections being in contiguous engagement with said one bearing section at respective ends thereof.

2. The invention as defined in claim 1 wherein the first respective radii are equal to the radius of the journal pin member.

3. The invention as defined in claim 1 wherein said first respective radii are equal to one another.

4. The invention as defined in claim 1 wherein the arc subscribed by said one of said upper and lower bearing sections is between 120°-150°.

5. The invention as defined in claim 4 wherein the arc subscribed by said one of said upper and lower bearing sections is substantially about 120°.

6. A journal bearing for rotatably supporting a cylindrical pin member for up and down movement with a piston and comprising:
    a generally cylindrical inner bearing surface adapted to receive the pin member and having a center, said inner bearing surface including a pair of diametrically opposed upper and lower arcuate bearing surfaces being generated by respective radii which are at least equal to the radius of the pin member, the radius which generates the upper bearing surface being offset from said center for a predetermined distance in the direction of said upper bearing surface and the radius which generates the lower bearing surface being offset from said center for a predetermined distance in the direction of said lower bearing surface whereby thin crescent-shaped spaces are formed between the pin member and the upper and lower bearing surfaces to trap lubricant between said upper and lower bearing surfaces when the pin member is in up and down positions, said inner bearing surface including a pair of diametrically opposed small clearance spaces on each side of said pin member to permit its up-and-down movement between said upper and lower bearing surfaces,
    said arcuate bearing surfaces being generated by radii equal to the radius of the pin member,
    said offsets being equal in distance from said center,
    said clearance spaces being defined by clearance surfaces which are generated by radii at least equal to he radius of the pin member and wherein each of the radii is offset a predetermined distance from said center towards the respective clearance surface generated thereby, and
    the arcs subscribed by said upper and lower bearing surfaces being between 120° and 150°.

7. The invention as defined in claim 6 wherein the arcs subscribed by said upper and lower bearing surfaces are substantially about 120°.

8. A journal bearing assembly comprising a first bearing having an outer cylindrical surface and an inner bearing surface, said first bearing have a predetermined length and said outer cylindrical surface circumscribing an arc of approximately 180°, second and third partially cylindrical bearings being located at each end of said first bearing to define a circumferential inner bearing surface having a center and adapted to support a relatively rotatively sliding pin member, said second and third bearings having a respective length substantially less than that of said first bearing whereby the sliding pin member will be unsupported thereby midway of said first bearing, said inner bearing surface including two pairs of diametrically opposed arcuate bearing surface portions, one of said pair of diametrically opposed bearing surface portion including an upper bearing section and a lower bearing section, the inner bearing surface of said upper and lower bearing sections being generated by respective radii equal to the radius of the pin member and from a respective axis lying on a first division diameter extending through said center and offset therefrom a predetermined distance toward said upper and lower bearing sections and the inner bearing surface generated thereby.

9. The invention as defined in claim 8 wherein each said upper bearing section extends circumferentially from end to end a distance less than 180°;

and each said lower bearing section being in contiguous engagement with a respective said upper bearing section at the ends thereof.

10. The invention as defined in claim 9 wherein the arc subscribed by each said upper bearing section is between 120°–150°.

11. The invention as defined in claim 10 wherein the arc subscribed by each said upper bearing section is substantially about 120°.

12. The invention as defined in claim 8 wherein the inner bearing surface of each said lower bearing section is guaranteed by respective radii from a respective axis lying on a second division diameter perpendicular to said first division diameter and extending through said center and offset therefrom a predetermined distance toward said lower bearing section and the inner bearing surface generated thereby.

13. The invention as defined in claim 12 wherein the said predetermined distances said two pairs of diametrically opposed arcuate bearing surface portions are offset are substantially equal.

* * * * *